(12) United States Patent
Davis et al.

(10) Patent No.: US 12,481,595 B2
(45) Date of Patent: Nov. 25, 2025

(54) METHOD FOR STORING AND ACCESSING A DATA OPERAND IN A MEMORY UNIT

(71) Applicant: BARCELONA SUPERCOMPUTING CENTER—CENTRO NACIONAL DE SUPERCOMPUTACIÓN, Barcelona (ES)

(72) Inventors: John D. Davis, Barcelona (ES); Steven Wallach, Barcelona (ES); Gerald Zuraski, Barcelona (ES)

(73) Assignee: BARCELONA SUPERCOMPUTING CENTER—CENTRO NACIONAL DE SUPERCOMPUTACIÓN, Barcelona (ES)

( * ) Notice: Subject to any disclaimer, the term of this patent is extended or adjusted under 35 U.S.C. 154(b) by 61 days.

(21) Appl. No.: 18/715,719

(22) PCT Filed: Dec. 3, 2021

(86) PCT No.: PCT/ES2021/070873
§ 371 (c)(1),
(2) Date: Jun. 2, 2024

(87) PCT Pub. No.: WO2023/099796
PCT Pub. Date: Jun. 8, 2023

(65) Prior Publication Data
US 2025/0036571 A1    Jan. 30, 2025

(51) Int. Cl.
*G06F 12/0895* (2016.01)
*G06F 12/0846* (2016.01)
*G06F 13/16* (2006.01)

(52) U.S. Cl.
CPC ...... *G06F 12/0895* (2013.01); *G06F 12/0846* (2013.01); *G06F 13/1668* (2013.01); *G06F 2212/301* (2013.01)

(58) Field of Classification Search
None
See application file for complete search history.

(56) References Cited

U.S. PATENT DOCUMENTS

| | | | |
|---|---|---|---|
| 5,651,135 A * | 7/1997 | Hatakeyama | G06F 12/0864 711/120 |
| 5,680,572 A | 10/1997 | Akkary et al. | |
| 2005/0268027 A1 | 12/2005 | Katsuki et al. | |
| 2015/0143044 A1 | 5/2015 | Gulati et al. | |

(Continued)

OTHER PUBLICATIONS

International Search Report and Written Opinion in related PCT application PCT/ES2021/070873, dated Jul. 1, 2022.

(Continued)

*Primary Examiner* — Charles J Choi
(74) *Attorney, Agent, or Firm* — Nathan & Associates Patent Agents Ltd.; Menachem Nathan (57) ABSTRACT

The present invention relates to a method for storing and accessing an operand in a memory unit of a computer, and specifically, to a method for accessing a data operand stored in a main memory unit with N independently controlled channels a memory cache and a tag store, wherein the method comprises the steps of comparing a physical address with the tag store, the cache tags comprising N status bits, referencing the channels, and a method for writing a data operand in a main memory unit with N independently controlled channels.

13 Claims, 3 Drawing Sheets

(56) References Cited

U.S. PATENT DOCUMENTS

2015/0254207 A1 9/2015 Kessler
2020/0081840 A1 3/2020 Kaushikkar et al.

OTHER PUBLICATIONS

Behnam Payman et al: "A Highly Set-Associative In-Package Cache Using Memristive Arrays", 2018 IEEE 36th International Conference on Computer Design (ICCD), IEEE, Oct. 7, 2018 (Oct. 7, 2018), pp. 423-430, XP033503396, DOI: 10.1109/ICCD.2018.00070 [retrieved on Jan. 16, 2019] abstract p. 423, left-hand column, line 40, figures 4, 5, 8, 9.

Hameed Fazal et al: Rethinking on-chip DRAM cache for simultaneous performance and energy optimization, Design, Automation & Test in Europe Conference & Exhibition (DATE), 2017, EDAA, Mar. 27, 2017 (Mar. 27, 2017), pp. 362-367, XP033096383, DOI: 10.23919/DATE.2017.7927017 [retrieved on May 11, 2017], abstract, p. 364, left-hand column, line 23-right-hand column, line 19, figure 1.

Espasa R et al: "Conflict-Free Accesses to Strided Vectors on a Banked Cache", IEEE Transactions on Computers, IEEE, USA, vol. 54, No. 7, Jul. 1, 2005 (Jul. 1, 2005), pp. 913-916, XP011132784, ISSN: 0018-9340, DOI: 10.1109 / TC.2005.110, abstract, p. 914, right-hand column, line 15-line 22.

\* cited by examiner

METHOD FOR STORING AND ACCESSING A DATA OPERAND IN A MEMORY UNIT

OBJECT OF THE INVENTION

The present invention relates to a method for storing and accessing an operand in a memory unit of a computer, and specifically, to a method for accessing a data operand stored in a main memory unit with N independently controlled channels, a memory cache and a tag store, wherein the method comprises the steps of comparing a physical address with the tag store, the cache tags comprising N status bits, referencing the N independent channels, and a method for writing a data operand in a main memory unit with N independently controlled channels.

BACKGROUND OF THE INVENTION

In current computer systems, the primary method of referencing physical data is first accessing the cache block that contains the referenced operand; typically, a cache block contains multiple sequentially addressed operands. Then the operand within the cache block is referenced (a load and/or store). This works quite well when references are sequential in nature. However, when subsequent references are not sequential, performance can be severely impacted. The reason being that one cache reference may only contain one referenced operand. When this happens, memory bandwidth and power associated with loading all the operands is expended, even though only one operand is used. In most systems, the individual processors on the system will have local cache structures to optimise access to data which is reused, or which is near data which has already been used.

However, very high-performance computing systems often make use of vector data structures. A vector means an array of values or more broadly, any large data structure. Programs manipulating arrays will often use a string of values from one or more vectors to perform a computation, writing results to another vector. This access pattern is different from the access patterns generally seen in general purpose computers, in that if one has several million-element vectors, accessing the values in each will simply overwrite data held in caches.

This is a known situation, and what is often done is to provide hardware to support streaming operations. Such hardware is informed that it will be asked for successive values from vectors, and fetches data ahead of time in as efficient a manner as practical, keeping the prefetched data in some form of buffering, so that desired data can be quickly provided when asked for. In the technical field, the distance between successive values of a vector is known as "stride"; the successive values may be any positive or negative integer, and it is valid for both vector loads and vector stores.

Most modern computing systems use dynamic random-access memory (DRAM) memory units. A characteristic of DRAM memory is that a read access will cause the memory die to select one of several internal buffers and to read a complete internal row of data into that row buffer from a DRAM page. Row buffer should be understood to mean a fast cache of the memory unit, formed by the last row read from a memory bank; physically, this is often implemented by the cells of the sense amplifiers of the read/write interface of the memory bank. These internal buffers are often referred to as pages; the selection of a page to fill is referred to as opening that page; when a new page is required, and all available are in use, a page must be selected and closed, and the new page must be opened to hold other data. When data is requested which is already in the row buffer, the data can be provided very quickly by the DRAM's logic without reading the main DRAM array. A DRAM die will generally provide some small number of row buffers, and reading data from a row buffer is both quicker and consumes less power than having to read from the memory array itself. Thus, there are three main latencies involved in DRAM operations: i) operations to a DRAM page already in the row buffer, ii) opening a page and performing the operation on this row buffer, and, iii) when all row buffers are occupied, selecting a page to close, opening a new page and performing the operation on this row buffer.

While it is feasible to construct useful adaptive heuristics for a single stream of accesses from a single processor, the general use of multiprocessor systems makes this much more difficult, because accesses from a few tens or hundreds of processors will look to the memory system as an essentially random set of requests. Memory controllers have added limited buffering to try to coalesce and reorder memory requests for optimal performance, but the window size is limited. Likewise, the caches and store buffers act as a write coalescing mechanism to reduce the number of DRAM writes.

There is therefore a need for methods which optimally use a memory unit for a given set of access patterns.

DESCRIPTION OF THE INVENTION

In order to overcome the problems found in the prior art, the present invention provides a method for accessing a data operand stored in a computer comprising a processing unit, and a main memory unit, the main memory unit comprising:
  memory configured to store data words operatively arranged in a plurality of rows, the rows being operatively divided in N columns, with N>1,
  a memory controller, configured to read or write data blocks comprised of one or more words from or in the memory, the memory controller comprising a memory cache configured to store blocks retrieved by the memory controller, and a tag store configured to store tags of the blocks stored in the memory cache,
  the memory further comprising a write buffer configured to write data words in the memory, and a store buffer, wherein the memory is in data communication with the processing unit through the memory cache, and wherein the memory cache is in data communication with the memory through N independently controlled channels, each channel configured to access one or more columns; the method comprising, when the processing unit requests access to the operand, by the memory controller, the steps of:
  receiving a physical address of the operand from the processing unit, wherein the physical address comprises a row index,
  comparing the physical address with the tags of the tag store, wherein the tags comprise N status bits, each referencing to a channel,
reading one or more blocks comprising the operand from the memory cache.

Throughout the present disclosure, it should be understood that the claimed method is directed to any type of computer or computer system, including networked computers and computers with several processing units. By operand should be understood any data element stored in the memory of the computer which is used by the processor in a computation or process; the operand should be understood to be the unit of data for a computation or process, regardless of the size of the data element. Examples of operands are integers, in particular large integers, vectors, and matrices. By data word, or simply word, should be understood a natural unit of data used by a particular processor or memory design; by data block, or block, should be understood a data element comprising one or more words which are transmitted to or from a memory unit in response to a single write or read instruction. By accessing, it should be understood an operation for either reading data from memory or writing data on memory, or both.

Preferably, the processing unit comprises a processor and several processing caches arranged hierarchically in levels, which are accessed sequentially in search of a requested operand. In an embodiment, the memory unit on which the method is executed is configured as a processing cache, in particular, a L3 cache, or level three cache.

The main memory unit, or simply, memory unit, comprises a memory proper, an array of memory cells, preferably implemented with several chips for storing data and other control and/or access circuitry; the memory unit is preferably a conventional dynamic random-access memory (DRAM) memory unit, and in a more preferred embodiment, it is an HBM, or High Bandwidth Memory; by HBM should be understood a high-speed computer memory interface for 3D-stacked synchronous dynamic random-access memory, SDRAM, achieved by stacking up to eight, or in some cases even more DRAM dies vertically interconnected by through-silicon vias, TSV. The processing caches should not be confused with the memory cache, which is a specific storage element of the memory unit configured to temporarily store data from the memory chips, and facilitate the write and read operations of the memory unit. The data is stored as data words in a conventional way in the memory, and it is operatively arranged in rows and columns. Said columns are accessed by means of N channels, or buses, each channel configured to access one or more columns; the blocks have a certain size, the same as the bandwidth of the channels, which depends on the size of the rows and the number N. The memory unit further comprises a tag store, a storage element configured to keep an updated list of the elements currently stored at the memory cache. The entries of the memory cache are identified by means of respective tags; each tag is generated from the physical address in memory of each block, and comprises N status bits, each corresponding to a channel, such that the tag identifies the channel or channels from which the block or blocks containing the operand can be read. For their part, the physical address comprises an index identifying the row of the block.

The operations performed on the memory unit, receiving a physical address of the operand from the processing unit, comparing the physical address of the operand with the tags of the tag store, reading the operand from the memory cache, and preferably transmitting the blocks to the processing unit, are performed by a memory controller, which, in an embodiment, comprises a processor.

Advantageously, each selective read or write has its own physical address, and when an operand is retrieved from memory according to the claimed method, the independent operation of the channels allows for a selective read of one or more blocks in a row, instead of reading the whole row of data. This is particularly advantageous when the requested operand is stored in a plurality of words belonging to different rows, which, in a conventional process would require to read separately each of the rows and storing a single block of the row. Thus, the present invention reduces the time required for memory accesses, and consumes less energy than conventional methods.

After receiving the physical address of the operand, and comparing it to the tags of the tag store, if there is a match, or a cache hit, the requested block is already stored in the memory cache, and the memory controller merely needs to read the cache entry that matches the physical address of the block, and then transmitting it to the processing unit. If there is no match, or in other words, there is a cache miss, the memory controller needs to retrieve the blocks from memory.

In a particular embodiment, after comparing the physical address with the tag, when there is a memory cache miss, the method comprises, by the memory controller, the steps of: reading a block from each of the channels for which the tag status bit is active, writing the blocks in the memory cache. The read from the memory is performed by reading the block or blocks which can be accessed simultaneously by all N channels, irrespective of the row to which they belong, or in other words, two words stored in the same column could not be accessed simultaneously by the corresponding channel, and therefore the read needs to be performed in two different accesses.

In a particular embodiment, the step of reading the blocks comprises reading a block from each of the channels according to an increasing physical address. Usually, the processes and operations run by a processing unit request several operands within a short period of time, which operands are often stored in neighbouring locations of the memory. In order to exploit the locality of the references, the memory controller reads not only the requested block, but also several following blocks, in increasing order of the physical memory. In another embodiment, the step of reading the blocks comprises reading a block from each of the channels according to a decreasing physical address.

In a particular embodiment, the memory comprises a multiplexer, and wherein the method comprises the step of selecting, by the memory controller, a word within a row with the multiplexer. A multiplexer is a preferred embodiment of the logic circuit which makes the selection of the channel possible and efficient.

In a particular embodiment, when two or more words comprising the operand are located in the same column and different rows, the memory controller executes the read or write operation as an out-of-order instruction. As in a case mentioned above, a read from memory operation may require the read of two or more blocks which cannot be accessed simultaneously by the channels, or expressed differently, the words are stored in the same column and different rows; in such cases the read requires two or more accesses. To minimize the latency of the process, the operation run by the memory controller may execute the computation or process as out-of-order instruction with the available data while waiting for the remaining data.

In a particular embodiment, when the operand is a vector reference, the processing unit access request comprises information of the stride and length of the vector reference. Preferably, if the operand is a vector, then there is a physical address for each vector element. The method is particularly advantageous in processing large operands such as vector references; vector references are defined by its stride and length, and under certain combination of these values, the access time to the memory is reduced.

In a particular embodiment, the memory unit comprises 2, 4 or 8 channels. Advantageously, the higher the number of channels, the higher the granularity of the blocks, which in turn, leads to fewer unnecessary data reads from memory.

In a particular embodiment, the memory unit is a High Bandwidth Memory, HBM, memory unit. The availability of High Bandwidth Memory provides a space and power-efficient means of constructing a very high-performance memory system. HBM provides high bandwidth by stacking multiple DRAM dies vertically, with the interconnect passing through all the die in the stack to a base die which houses controller logic to manage accesses to the die and to present data to the system to which the assembly is connected. Successive generations of HBM products will improve on capacity and bandwidth, even though current HBM memory units already have a 1024-bit interface and 8 channels, which allow for a very fast data access. In other embodiments, the memory unit is a different type of storage, such as NVRAM, 3D XPoint, NAND Flash, etc. In another embodiment, the memory unit comprises a combination of memory technologies, for example, a combination of HBM memory and 3D XPoint memory.

In a particular embodiment, the processing unit comprises a plurality of processing cores. Advantageously, the performance of the method is maximized in a large multicore computing system that computes mostly with vectors, showing much better-behaved access patterns, since all the computations are being done in a vector-like manner on linear arrays of data.

In a particular embodiment, the memory unit comprises a memory controller processing unit. Advantageously, the memory controller may comprise a tightly coupled processing unit, such that a program running on the processing unit can implement many different access strategies. The strategy desired for an upcoming program phase may be set by a protocol between application software and software running on the memory controller processing unit. In a preferred embodiment, the memory controller processing unit is of a Memory Controller CPU, MCPU. Additional MCPU can also be provisioned to run operating system, OS, services and other management functions, such as daemons, services and OS related services. Likewise, memory structures with the accelerator can serve multiple roles; for example, the shared L2 cache can use cache ways to provide a scratchpad.

In a particular embodiment, the method includes cache block prefetching.

In a particular embodiment, the method includes vector references.

In a second inventive aspect, the invention provides a method for writing a data operand in a main memory unit of a computer further comprising a processing unit, the main memory unit comprising:
  memory configured to store data words operatively arranged in a plurality of rows, the rows being operatively divided in N columns, with N>1,
  a memory controller, configured to read or write data blocks comprised of one or more words from or in the memory, the memory controller comprising a memory cache configured to store blocks retrieved by the memory controller, and a tag store configured to store tags of the blocks stored in the memory cache,
  the memory further comprising a write buffer configured to write data words in the memory, and a store buffer,
wherein the memory is in data communication with the processing unit through the memory cache, and wherein the memory cache is in data communication with the memory through N independently controlled channels, each channel configured to access one or more columns; the method comprising, when the processing unit requests to write the operand, by the memory controller, the steps of:
  receiving a physical address of the operand from the processing unit, the physical address comprising N valid bits and N dirty bits,
  receiving the operand from the processing unit,
  writing one or more blocks comprising the operand which addresses comprise an active valid bit and an active dirty bit in the memory cache,
  updating the tags of the tag store.

In a particular embodiment, when the operand is a vector operand and the operand is not stored in the cache, the method comprises the step of:
  writing the operand from the processing unit in the write buffer of the memory.

In a particular embodiment, when the operand is a vector operand and the operand is stored in the cache, the method comprises the steps of:
  setting to inactive the valid bit of one or more channels comprising the operand,
  writing the operand from the processing unit in the write buffer of the memory.

DESCRIPTION OF THE DRAWINGS

The foregoing and other advantages and features will be more fully understood from the following detailed description of exemplary embodiments with reference to the accompanying drawings, which should be considered by way of illustration and not limitation, in which.

NUMERICAL REFERENCES

100 Main memory unit
101 Memory multiplexer
102 Memory
103 Memory cache
104 Processing unit
105 Cache multiplexer
106 Tag store
107 Memory controller
109 Memory write buffer
201 Physical address
202 Tag

PREFERRED EMBODIMENT OF THE INVENTION

Throughout the present document it will be understood that various parts or steps of one embodiment of the invention can be freely combined with parts or steps described in other embodiments, even being said combination not explicitly described, provided there is no harm in such combination.

A preferred example of the present invention provides a mechanism to orchestrate memory operations across multiple requestors. This enables multiple benefits: i) the memory hierarchy is reformulated to present vectors instead of cache lines, and ii) by analysing the vectors, the DRAM system can be virtually extended providing additional DRAM row buffer capacity on-chip. The former provides a more efficient way to manipulate non-unit stride data structures and present them to the compute units, moving only useful data on chip. The latter reduces the energy requirements for larger granularity chunks of data, DRAM pages, and creates a larger virtually interleaved memory subsystem. This reduces latency and energy for requests to hot DRAM pages that otherwise would be re-opened and closed several times in the DRAM.

The described examples are implemented in a conventional computer, with an HBM memory unit (100) and a conventional processing unit (104). In one example, the HBM memory unit (100) has a memory controller (107), a 1024-bit wide interface, eight independently controlled channels (thus, N=8 in this example), each of them capable of providing 128 bits of data, and a memory cache 128-bits wide; in another example, the HBM memory unit comprises four channels, each of 256 bits, for a total of 1024 bits (N=4); in yet another example, the HBM memory unit comprises eight channels, each of 256 bits, for a total of 2048 bits (N=8). In a preferred example, depicted in FIG. 4, and which will be used in the following examples, the memory has a 512-bit wide interface and four channels (N=4), providing 128 bits each. Usually, a cache block can contain many operands, typically, up to eight 64-bit operands (or up to sixteen 32-bit operands).

Figure 1:
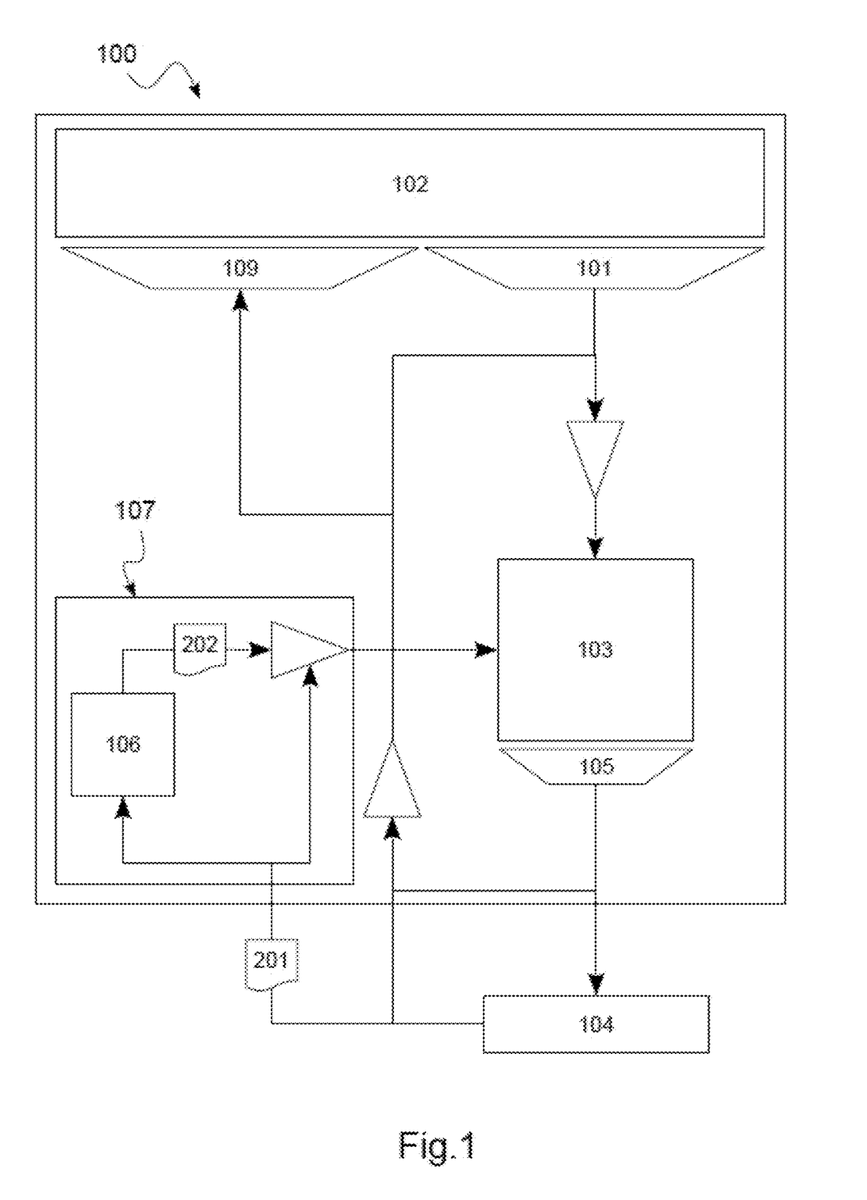
FIG. 1 represents a diagram of the main memory unit and the processing unit.

FIG. 1 shows a diagram of the HBM memory unit (102) and the processes involved in the method. The 512-bit memory is in data communication with the memory cache through a 4:1 multiplexer (101), and the memory cache (103) is in turn in data communication with the processing unit (104) by means of a 4:1 multiplexer (105).

Figure 2:
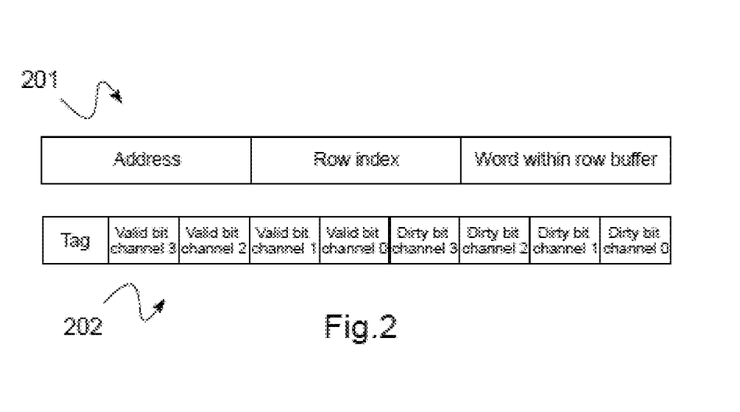
FIG. 2 represents a diagram of a physical address of a block and a cache tag.
Figure 3:
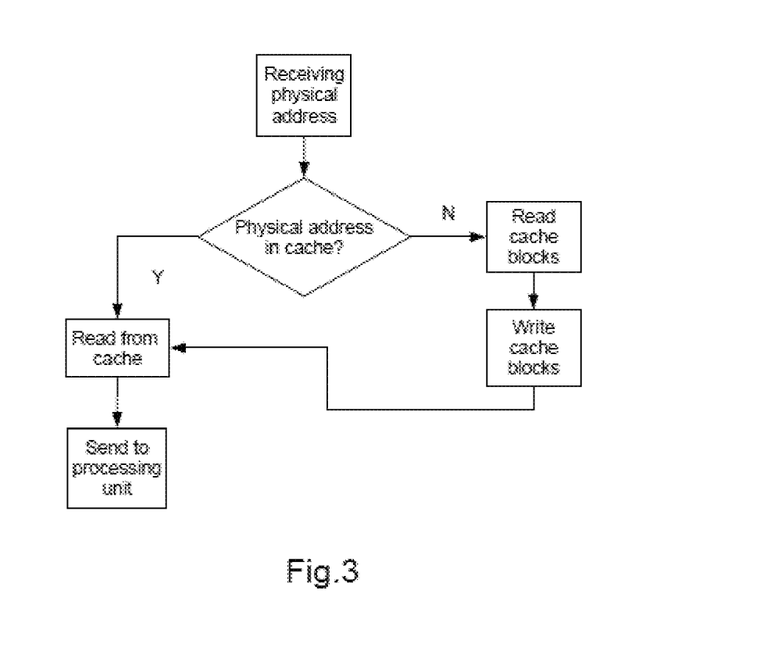
FIG. 3 represents a flow diagram of the method.

In this example, the operand access method is implemented as shown in FIG. 3, and described as follows: the processing unit issues a request for an operand, including a physical address (201), as shown in the top portion of FIG. 2; this physical address comprises a row index, indicating the block where the operand is stored. The physical address (201) is received by the memory controller (107), and compared with the tags (202) of the tag store. Preferably, the physical address (201) is issued by a translate lookaside buffer, TLB, of the processing unit (104).

If the requested operand is stored in the cache, the memory controller (107) simply reads the entry from the memory cache (103), and sends it to the processing unit (104). If the operand is not stored in the memory cache (103), the memory controller (107) accesses the memory (102) and simultaneously reads from the channels as many blocks as possible; this means that according to the location of the blocks in the rows of the memory, operands from different rows might be read at the same time, providing that they are stored in different columns.

Thus, if an operand extends over four memory blocks of the same row, the memory controller (107) reads all four channels simultaneously. Also, if the operand is stored in a single block, accessible by, for example, channel 2, the memory controller (107) reads only this channel 2, disregarding the data of the remaining channels.

Finally, the memory controller (107) writes the blocks in the memory cache (103), and sends them to the processing unit (104). For the above case, the operands in channel 2 are loaded from memory and stored in the cache; valid bit 1 of the tag (202) of the tag store (106), corresponding to channel 2, is set to logic "1", indicating the presence of the operand in the memory cache (103). Valid bits 3, 1, and 0, corresponding to channels 3, 1 and 0, respectively, would be set to logic "0". This indicates that the memory cache (103) does not contain the operands for channels, 3, 1, and 0 for the memory location referenced by the physical address (201).

Figure 4:
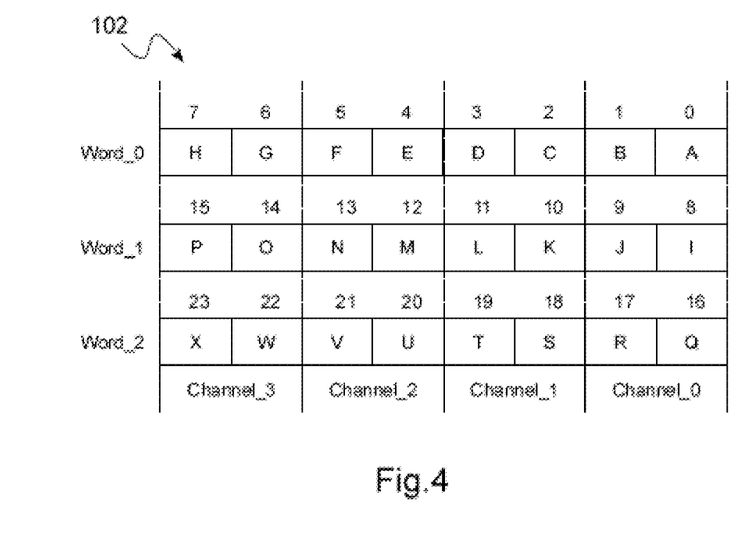
FIG. 4 represents a diagram of the contents of three memory rows with channels and operands.

FIG. 4 shows a simplified diagram of a memory (102) according to an example. In this example, the memory (102) has four channels and 512-bit rows, each row comprising four 128-bit data blocks (N=4), wherein each block comprises two 64-bit operands, each operand having a physical address (201); for convenience, FIG. 4 shows only three rows, and the operands are labelled A-X, each with a physical address represented by a numeral 0-23.

Next are described a few specific examples depending on the type of reference. In all of the following examples, it is assumed that the memory (102) is configured as in FIG. 4, where an HBM memory unit read reads four channels (N=4); further the term "foo" is used as a placeholder for any name. As required by the claimed method, the virtual channels can be independently controlled. This means the HBM read or write can be treated as four independent reads or writes. Independent means four physical addresses that are independent of one another.

Scalar Load

For the case of a scalar load, upon execution of an instruction for loading a scalar reference <G> into a processing unit (104) register, the processing unit (104) generates a physical address (201) for this operand "G", which is used to access the tag store (106); the output of the tag store (106) is compared to the tag field of the physical address (201). The valid bit is then examined; if the valid bit is "1" it means that the operand "G" is stored in the memory cache (103), and there is a cache hit; in this case, the cache multiplexer (105) retrieves the operand, and it is subsequently transmitted to the corresponding register of the processing unit (104).

If the valid bit is "0" it means that the operand "G" is not stored in the memory cache (103), and there is a cache miss. In such case, the operand "G" must be retrieved from the HBM memory (102). Memory accesses are costly, and therefore the locality of the references is exploited by look-ahead operations, i.e., the memory controller (107) loads the block containing the requested operand and the following blocks according to the increasing physical address. Since the memory (102) is accessed by means of independently controlled channels, the memory controller (107) accesses the channel and row where the operand "G" is stored, which according to FIG. 4 is row_0 and channel_3, which comprises operands "G" and "H". Also, the look-ahead process retrieves the content which can be accessed by channel_0, channel_1 and channel_2, which according to the increasing physical address are in row_1, namely operands "I" to "N". These operands are written in the memory cache (103), and the tag store (106) is updated accordingly, with the valid bits set to "1" for the corresponding channel, and the rest of valid bits set to "0".

Vector Loads

In a vector load instruction, several operands are loaded with the same instruction; to this end, the instruction must include i) a starting address of the first operand of the vector, ii) the length of the vector, or number of requested operands, and iii) the stride of the vector, or distance between successive operands. In an example, a vector starting at operand "C", with a length of four operands and a stride of 1, is requested; thus, the requested operands are "C", "D", "E", and "F" (henceforth, vector_1). Thus only 2 channels, 2 and 1, are READ. Channels 0 and 3 are not read. If the starting address was "A" and the stride was four, the requested operands would be "A", "E", "I", and "M" (henceforth, vector_2).

When vector_1 is requested, four physical addresses are generated by the processing unit (104), one for each operand. The subsequent access process is the same as in the case for a scalar load, with the difference that only channel_1 and channel_2, containing all four "C", "D", "E", and "F" operands, are read. Then the content of the tag store (106) is updated, setting to "1" the valid bits for channel_1 and channel_2, correspondingly.

In vector_2 the operands are stored in different rows, so the memory controller (107) must perform two access operations: one for row_0 at channel_0 and channel_2, and a second for row_1 at channel_0 and channel_2.

The process for reading an operand is similarly described for an example executed in the same computer as the previous cases, as follows: the processing unit (104) generates both the operand and the physical address (201) of the operand. The operand is loaded in the registers of the processing unit (104) and from there it is fed to the write buffer (109) and the cache (103), and the address (201) is fed to the tag store (106), which generates a tag (202) with N valid bits and N dirty bits; the dirty bits have the same purpose as in conventional memory configurations, but here the address (201) comprises one dirty bit for each channel. If the operand is not stored in the cache (103), a new entry is created for the operand, and in some examples, the write buffer (109) also writes the operand in the memory (102).

If the cache block where the operand needs to be written is already in use, then the content of the cache block is written in memory (102) first, and then the operand is written in the cache (103). Also, thanks to the dirty bits for each channel, only the block or blocks with active dirty bits are written through the corresponding channel.

A scalar operand can be regarded as vector operand of length 1, thus the only channels that are written are the channels that are marked dirty. If only one channels is dirty, then, only one word is written back to memory (102). Therefore, the write or store process is analogous for a vector operand, with the difference that when the operand is not in the cache (103), the operands are fed directly to the channels of the write buffer (109), and when data can no longer be written in the write buffer (109) a memory (102) write operation is conducted. Conversely, when the operand is in the cache (103), the corresponding valid bit is set to logic "0", and the previous process is conducted.

The invention claimed is:

1. Method for accessing a data operand stored in a computer comprising a processing unit, and a main memory unit, the main memory unit comprising:
   memory configured to store data words operatively arranged in a plurality of rows, the rows being operatively divided in N columns, with N>1,
   a memory controller, configured to read or write data blocks comprised of one or more words from or in the memory, the memory controller comprising a memory cache configured to store blocks retrieved by the memory controller, and a tag store configured to store tags of the blocks stored in the memory cache,
   the memory further comprising a write buffer configured to write data words in the memory, and a store buffer,
   wherein the memory is in data communication with the processing unit through the memory cache, and wherein the memory cache is in data communication with the memory through N independently controlled channels, each channel configured to access one or more columns;
   the method comprising, when the processing unit requests access to the operand, by the memory controller, the steps of:
   receiving a physical address of the operand from the processing unit, wherein the physical address comprises a row index,
   comparing the physical address with the tags of the tag store, wherein the tags comprise N status bits, each referencing to a channel,
   reading one or more blocks comprising the operand from the memory cache.

2. Method according to claim 1, wherein, after comparing the physical address with the tag, when there is a memory cache miss, the method comprises, by the memory controller, the steps of:
   reading a block from each of the channels for which the tag status bit is active,
   writing the blocks in the memory cache.

3. Method according to claim 2, wherein the step of reading the blocks comprises reading a block from the rest of channels according to an increasing physical address.

4. Method according to claim 1, wherein the memory comprises a multiplexer, and wherein the method comprises the step of selecting, by the memory controller, a word within a row with the multiplexer.

5. Method according to claim 1, wherein when two or more words comprising the operand are located in the same column and different rows, the memory controller executes the read or write operation as an out-of-order instruction.

6. Method according to claim 1, wherein when the operand is a vector reference, the processing unit access request comprises information of the stride and length of the vector reference.

7. Method according to claim 1, wherein the memory unit comprises 2, 4 or 8 channels.

8. Method according to claim 1, wherein the memory unit is a High Bandwidth Memory, HBM, memory unit.

9. Method according to claim 1, wherein the processing unit comprises a plurality of processing cores.

10. Method according to claim 1, wherein the memory unit comprises a memory controller processing unit.

11. Method for writing a data operand in a main memory unit of a computer comprising a processing unit, the main memory unit comprising:
    memory configured to store data words operatively arranged in a plurality of rows, the rows being operatively divided in N columns, with N>1,
    a memory controller, configured to read or write data blocks comprised of one or more words from or in the memory, the memory controller comprising a memory cache configured to store blocks retrieved by the memory controller, and a tag store configured to store tags of the blocks stored in the memory cache,
    the memory further comprising a write buffer configured to write data words in the memory, and a store buffer,
    wherein the memory is in data communication with the processing unit through the memory cache, and wherein the memory cache is in data communication with the memory through N independently controlled channels, each channel configured to access one or more columns;
    the method comprising, when the processing unit requests to write the operand, by the memory controller, the steps of:
    receiving a physical address of the operand from the processing unit, the physical address comprising N valid bits and N dirty bits,
    receiving the operand from the processing unit,
    writing one or more blocks comprising the operand which addresses comprise an active valid bit and an active dirty bit in the memory cache,
    updating the tags of the tag store.

12. Method according to claim 11, wherein, when the operand is a vector operand and the operand is not stored in the cache, the method comprises the step of:
 writing the operand from the processing unit in the write buffer of the memory.

13. Method according to claim 11, wherein, when the operand is a vector operand and the operand is stored in the cache, the method comprises the steps of:
 setting to inactive the valid bit of one or more channels comprising the operand,
 writing the operand from the processing unit in the write buffer of the memory.

* * * * *